US012791650B2

United States Patent

(12) United States Patent
Issakov et al.

(10) Patent No.: US 12,791,650 B2
(45) Date of Patent: *Nov. 10, 2026

(54) CROWD SOURCED BEACON ALTITUDES FOR 3D POSITIONING

(71) Applicant: QUALCOMM Incorporated, San Diego, CA (US)

(72) Inventors: Simon Issakov, Wayne, PA (US); Robert James Anderson, Bryn Mawr, PA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/628,496

(22) Filed: Apr. 5, 2024

(65) Prior Publication Data

US 2024/0288528 A1 Aug. 29, 2024

Related U.S. Application Data

(63) Continuation of application No. 17/221,148, filed on Apr. 2, 2021, now Pat. No. 11,977,141.

(51) Int. Cl.
*G01S 19/45* (2010.01)
*G01S 1/02* (2010.01)
(Continued)

(52) U.S. Cl.
CPC .............. *G01S 1/024* (2013.01); *G01S 19/45* (2013.01); *G06F 16/2379* (2019.01); *H04W 24/10* (2013.01)

(58) Field of Classification Search
CPC .... G01S 5/0242; G01S 5/0218; G01S 5/0295; G01S 5/02585; G01S 19/42; G01S 19/45; G01S 1/024; G01S 5/0258
(Continued)

(56) References Cited

U.S. PATENT DOCUMENTS

| | | |
|---|---|---|
| 7,974,640 B2 | 7/2011 | Anderson |
| 8,199,050 B2 | 6/2012 | Boyer et al. |

(Continued)

FOREIGN PATENT DOCUMENTS

| | | |
|---|---|---|
| CN | 106662442 A | 5/2017 |
| EP | 2805176 A2 | 11/2014 |

(Continued)

OTHER PUBLICATIONS

International Preliminary Report on Patentability—PCT/US2022/018503—The International Bureau of WIPO—Geneva, Switzerland—Oct. 12, 2023.

(Continued)

*Primary Examiner* — Chuong P Nguyen
(74) *Attorney, Agent, or Firm* — Muncy, Geissler, Olds & Lowe, P.C.

(57) ABSTRACT

In various embodiments, crowd sourcing techniques are provided to determine beacon altitudes that may then be used in 3D positioning of UE. Some techniques may crowd source beacon altitudes based on global navigation satellite system (GNSS) position fixes obtained by UE. Other techniques may crowd source beacon altitudes based on uncalibrated pressure measurements obtained by UE. Still other techniques may combine beacon altitude crowd-sourcing and pressure sensor calibration on UE. Such techniques may make inferences based on line of sight (LOS) between UE and beacons, determined using signal strength, connection status, and/or timing measurement. The techniques may be implemented separately, or as part of a combined system that determines beacon altitudes in diverse manners. Once beacon altitudes are known, that may be used to determine 3D positions of the UE (e.g., by trilateration, multilateration or other positioning techniques).

19 Claims, 5 Drawing Sheets

(51) Int. Cl.
*G06F 16/23* (2019.01)
*H04W 24/10* (2009.01)

(58) Field of Classification Search
USPC ...... 342/357.25, 357.28, 385, 450, 451, 462
See application file for complete search history.

(56) References Cited

U.S. PATENT DOCUMENTS

| | | | | |
|---|---|---|---|---|
| 8,320,939 | B1 | 11/2012 | Vincent | |
| 8,559,974 | B2 | 10/2013 | Alizadeh-Shabdiz et al. | |
| 8,639,266 | B2 | 1/2014 | Zelinka et al. | |
| 9,037,160 | B2 | 5/2015 | Jones et al. | |
| 9,137,771 | B2 * | 9/2015 | Wrappe | G01S 5/0036 |
| 9,261,370 | B2 | 2/2016 | Poornachandran et al. | |
| 9,354,323 | B2 | 5/2016 | Anderson et al. | |
| 9,380,425 | B2 * | 6/2016 | Meredith | H04L 67/535 |
| 9,383,202 | B2 | 7/2016 | Zhou et al. | |
| 9,408,037 | B1 | 8/2016 | Alizadeh-Shabdiz et al. | |
| 9,432,811 | B2 | 8/2016 | De Lorenzo et al. | |
| 9,612,114 | B2 * | 4/2017 | Wachter | G01C 5/06 |
| 9,736,644 | B2 | 8/2017 | Meredith et al. | |
| 9,763,050 | B2 * | 9/2017 | Belghoul | H04W 4/02 |
| 9,763,051 | B2 * | 9/2017 | Belghoul | H04W 4/02 |
| 9,843,890 | B2 | 12/2017 | Do et al. | |
| 9,980,246 | B2 | 5/2018 | Pattabiraman et al. | |
| 9,986,529 | B2 | 5/2018 | Palanki et al. | |
| 10,034,265 | B2 | 7/2018 | Alizadeh-Shabdiz et al. | |
| 10,057,727 | B2 * | 8/2018 | Maricic | H04W 4/029 |
| 10,254,379 | B2 | 4/2019 | Sendonaris et al. | |
| 10,386,448 | B2 * | 8/2019 | Wolf | G01S 19/45 |
| 10,571,547 | B2 | 2/2020 | Oh et al. | |
| 10,655,961 | B2 * | 5/2020 | Dormody | G01C 5/06 |
| 10,719,983 | B2 | 7/2020 | Levy et al. | |
| 10,746,545 | B2 | 8/2020 | Fleming | |
| 10,848,911 | B1 * | 11/2020 | Mallesan | G01S 5/02695 |
| 11,067,664 | B2 * | 7/2021 | Oh | G01S 1/024 |
| 11,165,526 | B2 | 11/2021 | Madine et al. | |
| 11,337,031 | B2 * | 5/2022 | Mallesan | H04W 4/025 |
| 11,395,252 | B2 | 7/2022 | Issakov et al. | |
| 11,422,218 | B2 | 8/2022 | Khan et al. | |
| 11,536,564 | B2 * | 12/2022 | Dormody | G01C 25/00 |
| 11,592,595 | B2 * | 2/2023 | Seibert | H04W 4/029 |
| 11,644,310 | B2 * | 5/2023 | Vogedes | G01C 5/06 702/166 |
| 12,066,344 | B2 * | 8/2024 | Wang | G01L 27/005 |
| 2009/0210156 | A1 | 8/2009 | Riley et al. | |
| 2011/0106449 | A1 | 5/2011 | Chowdhary et al. | |
| 2011/0115671 | A1 | 5/2011 | Sweet, III et al. | |
| 2013/0023282 | A1 | 1/2013 | Lin et al. | |
| 2013/0069821 | A1 | 3/2013 | Jambulingam et al. | |
| 2013/0252628 | A1 | 9/2013 | Kuehnel | |
| 2015/0133145 | A1 | 5/2015 | Palanki et al. | |
| 2015/0212191 | A1 | 7/2015 | Zhang et al. | |
| 2015/0330779 | A1 * | 11/2015 | Moeglein | G01C 5/06 342/462 |
| 2016/0033286 | A1 | 2/2016 | Gemelli | |
| 2016/0258749 | A1 | 9/2016 | Macgougan et al. | |
| 2017/0339518 | A1 * | 11/2017 | Do | H04W 4/185 |
| 2018/0038695 | A1 | 2/2018 | Bitra et al. | |
| 2020/0027265 | A1 | 1/2020 | Levy et al. | |
| 2022/0317227 | A1 | 10/2022 | Issakov et al. | |
| 2022/0342024 | A1 * | 10/2022 | Khan | G01S 5/02 |

FOREIGN PATENT DOCUMENTS

| | | | |
|---|---|---|---|
| GB | 2460184 | A | 11/2009 |
| JP | 2004045274 | A | 2/2004 |
| JP | 2016200481 | A | 12/2016 |
| WO | 2016025902 | A1 | 2/2016 |

OTHER PUBLICATIONS

International Search Report and Written Opinion—PCT/US2022/018503—ISA/EPO—Jun. 29, 2022.

* cited by examiner

CROWD SOURCED BEACON ALTITUDES FOR 3D POSITIONING

CROSS-REFERENCE TO RELATED APPLICATIONS

The present Application for Patent is a continuation of U.S. patent application Ser. No. 17/221,148, entitled "CROWD SOURCED BEACON ALTITUDES FOR 3D POSITIONING," filed Apr. 2, 2021, assigned to the assignee hereof, and expressly incorporated herein by reference in its entirety.

BACKGROUND

Technical Field

The present disclosure relates generally to user equipment (UE) positioning, and more specifically to three-dimensional (3D) positioning of UE.

Background Information

Determining 3D UE position is becoming increasing important for providing emergency services, providing non-emergency location-based services, managing user profiles, tracking the location of devices, and other tasks. 3D position is typically provided as a 2D position on the Earth's surface (e.g., represented in terms latitude and longitude) and an altitude (e.g., represented in terms of elevation above sea level, floor level, etc.). The inclusion of altitude data may: enable emergency responders to reach the correct address; provide more accurate information for use by non-emergency location-based services; update user profiles more accurately; as well as provide many other benefits.

Various existing positioning techniques have some ability to estimate altitude. For example, Global Navigation Satellite System (GNSS) positioning (e.g., global positioning system (GPS) positioning) can estimate altitude of UE by trilateration with four or more satellites. However, many existing techniques suffer from low accuracy. For example, with GPS, vertical error is often about three times the horizontal error. As such, an individual altitude determined using GPS may only be accurate to within about 35-70 feet. This may be insufficient for many use cases, for example, for emergency location services.

Another common method for estimating altitude is to use uncompensated barometric pressure (UBP) measurements to directly calculate altitude. Some UE include a pressure sensor that measures ambient barometric pressure. The resulting UBP can then be used to calculate altitude (e.g. using a barometric equation). However, in order to provide the accuracy required by many use cases it is often necessary to uniquely calibrate the pressure sensor of each UE. Some UE may not support such calibration, or such calibration may be burdensome using existing calibration techniques. Further, ambient barometric pressure depends on weather conditions and changes over time. These changes in weather conditions, may cause errors in altitude directly calculated from UBP measurements.

Due to the limitations and problems associated with existing technology, there is a need for improved techniques to enable 3D positioning of UE.

SUMMARY

In various embodiments, crowd sourcing techniques are provided to determine beacon altitudes that may then be used in 3D positioning of UE. Some techniques may crowd source beacon altitudes based on GNSS position fixes obtained by UE. Other techniques may crowd source beacon altitudes based on uncalibrated pressure measurements obtained by UE. Still other techniques may combine beacon altitude crowd-sourcing and pressure sensor calibration on UE. Such techniques may make inferences based on line of sight (LOS) between UE and beacons, determined using signal strength, connection status, and/or timing measurements. The techniques may be implemented separately, or as part of a combined system that determines beacon altitudes in diverse manners. Once beacon altitudes are known, that may be used to determine 3D positions of the UE (e.g., by trilateration, multilateration or other positioning techniques).

In one embodiment, for each of a plurality of UE, altitude of the UE is estimated at a time based on one or more GNSS-based position fixes for the UE. One or more beacons that have LOS with the UE at the time are determined based on observations of beacons by the UE. Altitude of the UE is bound to each beacon of the one or more beacons having LOS at the time. Then, for one or more beacons, beacon altitude is determined based on a set of bound altitudes for the respective beacon, and a beacon database updated with the determined beacon altitude. At least a portion of the beacon database is provided to UE to enable the UE to calculate their 3D position (e.g., by trilateration, multilateration or other positioning techniques).

In another embodiment, for each of a plurality of UE, altitude of the UE is estimated at a time based on a reference point (e.g., a reference pressure such as a reference UBP and reference altitude) measured by the UE and a tracked altitude change (e.g., a pressure change such as a UBP change) measured by the UE. One or more beacons that have LOS with the UE at the time are determined based on observations of beacons by the UE. Altitude of the UE is bound to each beacon of the one or more beacons having LOS at the time. Then, for one or more beacons, beacon altitude is determined based on a set of bound altitudes for the respective beacon, and a beacon database updated with the determined beacon altitude. At least a portion of the beacon database is provided to UE to enable the UE to calculate their 3D position (e.g., by trilateration, multilateration or other positioning techniques).

In yet another embodiment, for each of a plurality of calibration points, altitude of UE is calculated at a time based on a UBP measurement. Altitude of the UE at the time is estimated based on a GNSS-based position fix for the UE. UBP-calculated altitude is compared to the GNSS-estimated altitude to calculate an individual bias. A plurality of individual biases are combined to produce a final bias that is returned to the UE to enable calibration of the pressure sensor of the UE. Additionally, for one or more beacons, a beacon altitude is determined based on a plurality of UBP-calculated altitudes from calibration points and a beacon database updated with the determined beacon altitude. At least a portion of the beacon database is provided to UE to enable the UE to calculate their 3D position (e.g., by trilateration, multilateration or other positioning techniques), providing an alternative or supplement to calibrated sensor based altitude determination.

It should be understood that the embodiments discussed in this Summary may include a variety of other features, including other features discussed below, and variations thereof. Further a variety of other embodiments may be utilized involving various combinations of the features discussed herein and below, and variations thereof. This Summary is intended simply as a brief introduction to the reader, and does not imply that the specific features mentioned herein are all the features of the invention, or are essential features of the invention.

BRIEF DESCRIPTION OF THE DRAWINGS

The description below refers to the accompanying drawings, of which.

DETAILED DESCRIPTION

Figure 1:
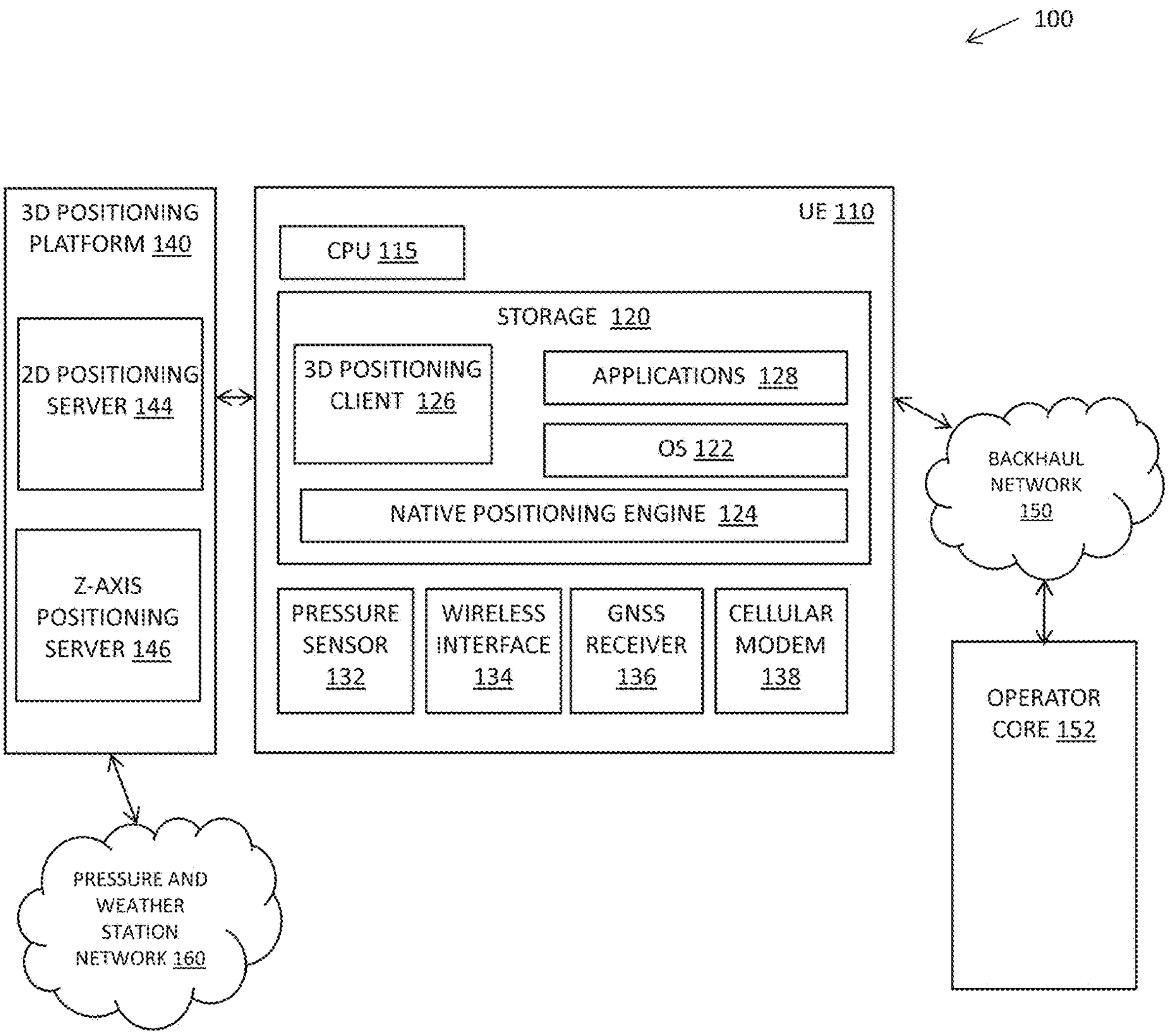
FIG. 1 is a block diagram of an example architecture for crowd-sourcing beacon altitudes for 3D positioning of UE.

FIG. 1 is a block diagram of an example architecture 100 for crowd-sourcing beacon altitudes for 3D positioning of UE. As used herein, the term "user equipment" or "UE" refers to a mobile devices, wearable devices, customer-premises equipment (CPE), drones or Internet of Things (IoT) devices operated by, or for, an end user. Examples of UE include smartphones, smartwatches, 4G/5G cellular routers, unmanned aerial vehicles (UAVs), and sensors, among others. Likewise, as used herein the term "beacon" refers to a device having a fixed position that exchanges signals which may be used to determine a position of UE. Examples of beacons include Wi-Fi APs, Bluetooth Low Energy (BLE) transmitters (such as iBeacon® proximity beacons, Eddystone® proximity beacons, AltBeacon™ proximity beacons, etc.), and indoor small cells, among other devices. Further, as used herein the terms "location" and "position", when appearing alone or as part of a longer phrase, are used interchangeably and should be attributed the same meaning.

While a single example UE 110 is shown in FIG. 1, it should be understood that a typical architecture will include a larger number of UE (e.g., thousands, hundreds of thousands, millions, etc.) and that crowd-sourcing may take advantage of these numbers. UE 110 typically include a central processor unit (CPU) 115 and storage 120 (e.g., volatile and non-volatile memory) that maintains software including an operating system (OS) 122, a native positioning engine 124 (that may be a part of the OS 122), a 3D positioning client 126, and 3$^{rd}$ party applications 128. The operating system 122 may be a commercially available OS (e.g., IOS®, Android®, etc.) that provides a positioning application program interface (API) for accessing functionality of the native positioning engine 124. The native positioning engine 124 may interoperate with a pressure sensor 132 (e.g., a microelectromechanical systems (MEMS) pressure sensor) to collect UBP measurements, with a wireless network interface 134 (e.g., a Wi-Fi interface operating according to a IEEE 802.11 standard, a Bluetooth interface, etc.) to perform scans of beacons within range, with a GNSS receiver 136 to produce a GNSS position fix (e.g., a 3D fix including altitude), and with a cellular modem 138 to collect serving cell and neighboring cell measurements, among a variety of other functions. Scans of beacons within range may indicate their identities (e.g., media access control (MAC) address, Bluetooth device address, etc.), signal strength (e.g. Received Signal Strength Indicator (RSSI)), connection status (e.g., a "connected" flag"), timing (e.g., timing advance (TA), round-trip time (RTT), etc.) and/or other characteristics. The 3D positioning client 126 may work together with the native positioning engine 124 to service 3D positioning requests issued by the 3$^{rd}$ party applications 128, providing to them 3D position (e.g., for non-emergency location-based services, profile generation, etc.). The 3D positioning client 126 may also work together with the native positioning engine 124 to provide 3D position to remote applications, for example, executing on an operator core 152 that is accessible via a 2G/3G/4G/5G backhaul network 150 (e.g., for emergency services, tracking device locations, etc.). The 3D position typically includes a 2D location on the Earth's surface (e.g., represented in terms latitude and longitude or another measure in a x-y plane of a geographic coordinate system) and an altitude (e.g., represented in terms of elevation above the World Geodetic System of 1984 (WGS84) ellipsoid, mean sea level, floor level, or another measure along a z-axis).

The 3D positioning client 126 and/or native positioning engine 124 may communicate with a cloud-based 3D positioning platform 140 that maintains a beacon database 142. The beacon database 142 may include crowd-sourced characteristics of beacons, including crowd-sourced 3D positions of beacons. Portions of the beacon database 142 that cover a specific geographic area (e.g., tiles) may be downloaded to the UE 110 and cached for use as a local copy. The local copy may be used by the 3D positioning client 126 and/or native positioning engine 124 to determine position (e.g., 3D position) of the UE (e.g., by trilateration, multilateration or other positioning techniques). Further, information derived from scans or otherwise collected by components 132-138 of the of the UE 110 (e.g., beacon identities, signal strength, signal timing, UBP, user activity, etc.) may be periodically (or dynamically in response to a trigger) uploaded to the 3D positioning platform 140 which uses the information to update and expand the beacon database 142. To this end, the 3D positioning platform 140 may include a hybrid 2D positioning server 144 that, among other capabilities, is able to determine (e.g., estimate) 2D positions of beacons from crowd-sourced information, and a z-axis positioning server 146 that, among other capabilities, is able to determine (e.g., estimate) altitude of beacons from crowd-sourced information, and, in some cases, additional data from other data sources (e.g., pressure and weather data from a pressure and weather station network 160).

Figure 2:
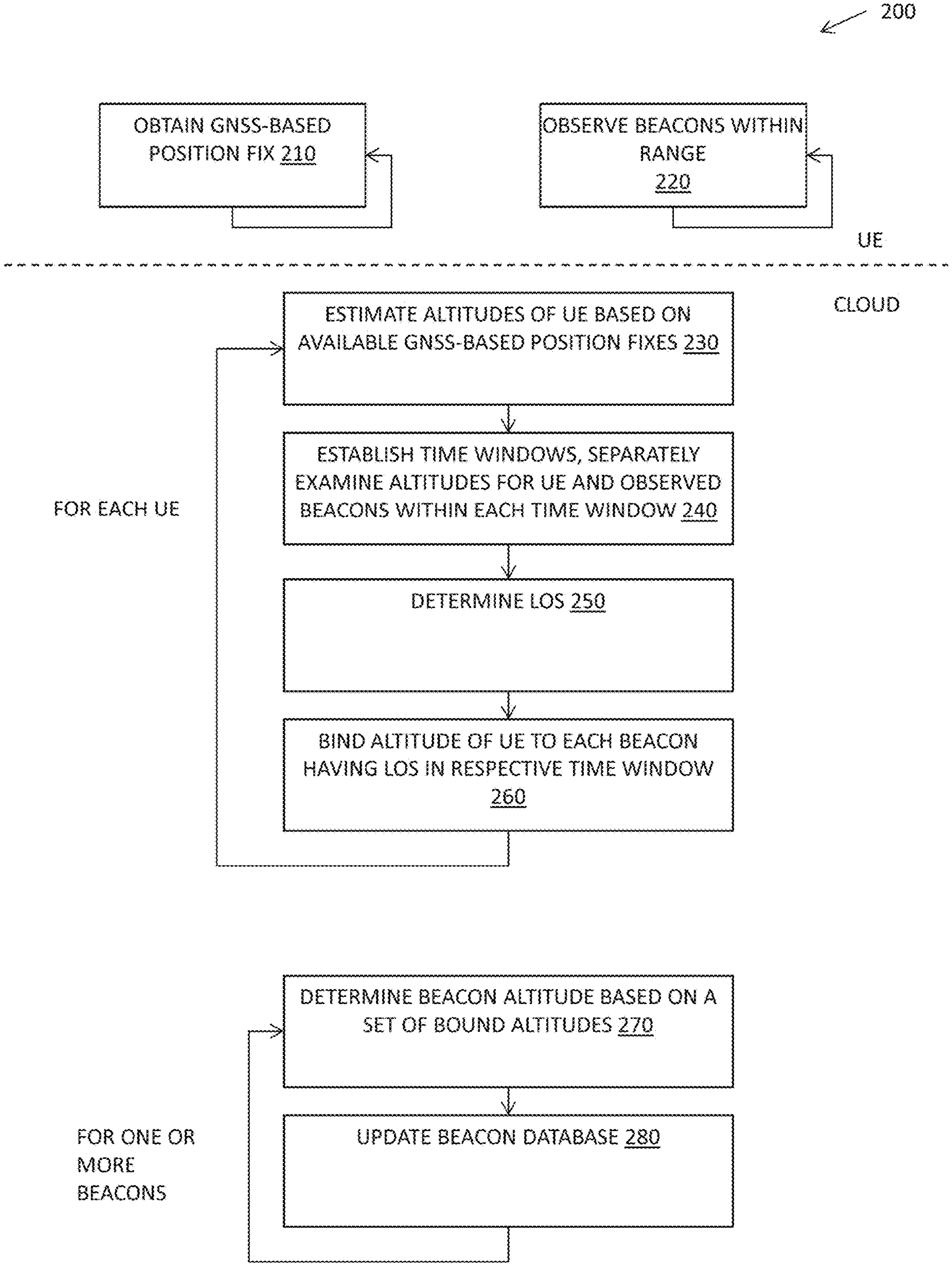
FIG. 2 is a flow diagram of an example sequence of steps for GNSS-based crowd-sourcing of beacon altitudes.

In a first embodiment, the 3D positioning client 126 on UE 110 and the z-axis positioning server 146 of the 3D positioning platform 140 implement a GNSS-based crowd-sourcing technique to determine beacon altitudes that may then be used in 3D positioning of UE 110. FIG. 2 is a flow diagram of an example sequence of steps 200 for GNSS-based crowd-sourcing of beacon altitudes. Steps 210-220 may be performed in parallel on each of a large number of UE 110 to crowd source information. Steps 230-280 may be performed on the 3D positioning platform 140 in the cloud to aggregate the crowd-sourced information.

At step 210, on each UE 110, the 3D positioning client 126 obtains a GNSS-based position fix for the UE determined by the native positioning engine 124 working with the GNSS receiver 136. The GNSS-based position fix may be obtained periodically, in response to requests by the 3$^{rd}$ party applications 128, in response to requests by the 3D positioning client 126, and/or in response to other triggers. In one implementation, the GNSS-based position fix may be a fused position fix (e.g., an Android® fused location provider (FLP) fix or another hybrid fix calculated using multiple positioning technologies) provided by the native positioning engine 124 that combines a GNSS position fix produced using the GNSS receiver 136 with a position estimate produced using Wi-Fi or cellular data. In another implementation, the GNSS-based position fix may be a solely GNSS position fix that is solely based on GNSS measurements and not combined with any other types of measurements. The GNSS-based position fix, together with timestamps, may be stored in a local cache of the 3D positioning client 126.

Simultaneous to step 210, at step 220, on each UE, the 3D positioning client 126 observes beacons within range of the UE 110, including their identities and signal strength (e.g., RSSI), connection status (e.g., a "connected" flag") and/or timing measurement (e.g., TA, RTT, etc.), and/or other characteristics. The observations may be the result of scans performed using the native positioning engine 124 and the wireless network interface 134. The characteristics of observed beacons together with a timestamp may be stored in the local cache of the 3D positioning client 126.

Periodically, or in response to a dynamic trigger (e.g., receiving a user opt-in, detecting an emergency call, etc.), contents of the local cache of each UE may be uploaded to the 3D positioning platform 140 in the cloud as a batch. For each UE 110 providing a batch, at step 230, the z-axis positioning server 146 of the 3D positioning platform 140 estimates altitudes of the UE based at least in part on available GNSS-based position fixes (e.g., fused position fixes or solely GNSS position fixes). Such estimating may simply involve extracting the z-axis component from each available GNSS-based position fix. Alternatively, more involved operations may be performed. As part of the step, one or more indicators of altitude quality may be determined for each altitude. In one implementation, an indicator may be vertical uncertainty (VPE). The lower the VPE the better the altitude estimate. Altitudes having VPE above a given threshold may be ignored in further processing. In another implementation, an indicator may be speed of the UE at the time of the GNSS position fix. The lower the speed, the more likely the UE is stationary and thereby its altitude is better suited for use in determining beacon altitude. Altitudes having GNSS position fix speed above a given threshold may be ignored in further processing. The result of this step may be a list of good quality GNSS-based altitudes and timestamps, which may be used in conjunction with the characteristics of observed beacons and timestamps provided as part of the batch.

At step 240, the z-axis positioning server 146 of the 3D positioning platform 140 establishes time windows (e.g., a 5 second (s) time windows) and separately examines altitudes for the UE 110 and observed beacons which fall within each time window.

At step 250, the z-axis positioning server 146 determines whether there is LOS to each beacon observed in each time window. LOS refers a straight signal path between two entities substantially unobstructed by intervening objects. It may be assumed that in most deployments there will only be LOS when UE 110 and a beacon are at substantially the same altitude. For example, UE 110 and a beacon on different levels (e.g., floors) of a building typically will not have LOS given the intervening floor deck. While there may some opening between floors, such as stairs, atriums, etc., that could provide LOS, it is far more likely that if there is LOS the UE 110 and beacon are located in the same room on the same floor.

In some implementation, LOS may be determined by comparing a signal strength indicator (e.g. RSSI) to threshold(s) (e.g., empirically determined threshold(s)) since high signal strength is typically indicative of LOS. The signal strength indicator used and the threshold(s) may vary based on the radio frequency (RF) band/channel, type of beacon, model of beacon of a type, manufacturer of beacon of a type, other criteria. For example, a different signal strength indicator and threshold(s) may be provided for the 2.4 gigahertz (GHz) Wi-Fi band and the 5 GHz Wi-Fi band. Similarly, a different signal strength indicator and threshold(s) may be provided for Wi-Fi APs, iBeacon® proximity beacons, Eddystone® proximity beacons, and AltBeacon™ proximity beacons. Likewise, a different signal strength indicator and threshold(s) may be provided for one model of Wi-Fi AP than another model of Wi-Fi AP, or for one manufacturer of Wi-Fi AP than another manufacture of Wi-Fi AP. Further, multiple different signal strength indicator may be examined and combined in different manners, for example, based on the radio frequency (RF) band/channel, type of beacon, model of beacon of a type, manufacturer of beacon of a type, other criteria.

Table 1 is a listing of example different signal strength indicators and threshold(s) that may be used to determine LOS in one implementation.

TABLE 1

| | |
|---|---|
| Wi-Fi AP 2.4 GHz | RSSI > −35 dbm |
| Wi-Fi AP 5 GHz | RSSI > −41 dbm |
| iBeacon ® | TxPower − RSSI < 10 db |
| iBeacon ® Calibrated | RSSI @ 1 m − Pathloss > −60 db |
| AltBeacon ™ | RangingData − RSSI − 60 dbm < 10 db |
| Eddystone ® Calibrated | RSSI @ 1 m − Pathloss > −60 db |
| iBeacon ® | Ref_RSSI − RSSI < 10 db |
| AltBeacon ™ Calibrated | RSSI @ 1 m − Pathloss > −60 db |

In other implementations, LOS may be determined by examining connection status (e.g., a connected flag). UE typically will connect to beacons having good signal strength, and the formation of such a connection may be indicative of LOS.

In still other implementations, LOS may be determined by analyzing timing measurements (e.g., TA value, RTT, etc.). Low timing measurements alone may not necessarily be indicative of LOS. However, when multipath is considered, a signal that has both low timing measurements (as compared to a threshold), and higher signal strength other related signals, may be assumed to have LOS. For example, consider that due to multipath there are a plurality of signals between UE 110 and a given beacon. If one signal measurement has a low timing measurement, and higher signal strength than the other signal measurements, it may be assumed that such signal measurement is for a direct path which has LOS. Conversely, if the one signal measurement has a low timing measurement, but also lower signal strength than the other signal measurements, it may be assumed there is an obstruction (e.g., wall, floor, etc.) and therefore such signal measurement is for a path that does not have LOS.

It should be understood that signal strength (e.g. RSSI)), connection status (e.g., a connected flag) and timing measurements (e.g., TA value, RTT etc.) may be combined in a variety of different manners to determine LOS. Further, a variety of other characteristics may be combined with signal strength, connection status (e.g., a connected flag) and/or timing measurements in such a determination. Combinations may be based, at least in part, on empirically measured statistics. At step 260, the z-axis positioning server 146 binds an altitude of the UE 110 to each beacon having LOS in the respective time window. Where there is a single altitude within the time window, that altitude may be bound to each beacon. When there are multiple altitudes within the time window an altitude may be selected therefrom. In one implementation, the altitude closest in time to the center of the time window may be selected and used. Alternatively, altitudes may be combined (e.g., averaged) and the result bound to each beacon.

After steps 230-260 have been performed for a set of UE 110 (e.g., a large number of UE), for each beacon, at step 270, the z-axis positioning server 146 determines beacon altitude of the beacon based on a set of bound altitudes. Altitude of the beacon may be determined as the combination (e.g., average) of the bound altitudes for that beacon. GNSS-based position fixes individually may have large uncertainty, however average error may be small over a sufficiently large set. Alternatively, altitude for the beacon may be based on previously determined altitudes of one or more beacons already in the beacon database 142 inferred to be at a same level (e.g., same floor of a building) from the bound altitudes. For example, if the beacon and a beacon having a previously determined altitude are repeatedly bound to substantially the same altitude, the two beacons may be assumed to be on the same level, and the previously determined altitude may be assigned to the beacon as well. Such an inference may allow higher accuracy altitudes to be propagated among beacons.

At step 280, the 3D z-axis positioning server 146 updates the beacon database 142 to assign the determined altitude to the beacon. Steps 270-280 may thereafter be repeated for additional beacons. Thereafter, updated portions of the beacon database 142 (e.g., tiles) may be downloaded to UE 110 and used by the 3D positioning client 126 to determine 3D positions of the UE 110 (e.g., by trilateration, multilateration or other positioning techniques).

Figure 3A:
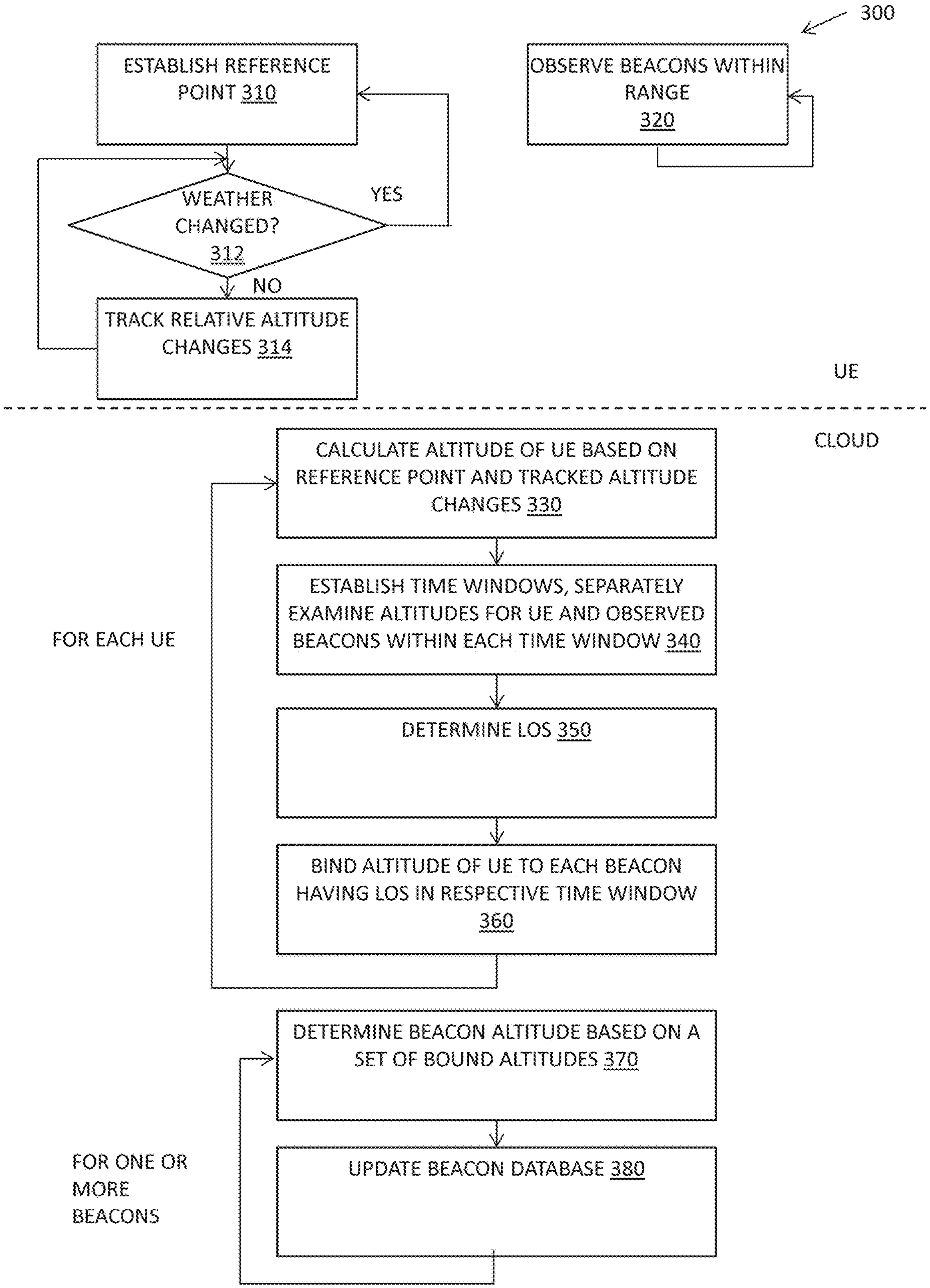
FIG. 3A is a flow diagram of an example sequence of steps for uncalibrated pressure-based crowd-sourcing of beacon altitudes.

In a second embodiment, the 3D positioning client 126 on UE 110 and the z-axis positioning server 146 of the 3D positioning platform 140 in the cloud implement an uncalibrated pressure-based crowd-sourcing technique to determine beacon altitudes that may then be used in 3D positioning of UE. FIG. 3A is a flow diagram of an example sequence of steps 300 for uncalibrated pressure-based crowd-sourcing of beacon altitudes. To better understand the steps 300 of FIG. 3A, reference is also made to FIG. 3B, which is diagram 385 illustrating an example of uncalibrated altitude determination that may be used in crowd-sourcing of beacon altitudes. Steps 310-320 may be performed in parallel on each of a large number of UE 110 to crowd source information. Steps 330-380 may be performed on the 3D positioning platform 140 in the cloud to aggregate the crowd-sourced information.

At step 310, on each UE 110, the 3D positioning client 126 establishes a reference point that includes a reference pressure and a reference altitude. The reference pressure may be a UBP (or an average of UBP over a period of time). The reference altitude may be ground level (i.e. altitude above ground level (AGL)=0) or another known altitude (e.g., a previously determined altitude of a beacon already in the beacon database 142).

Figure 3B:
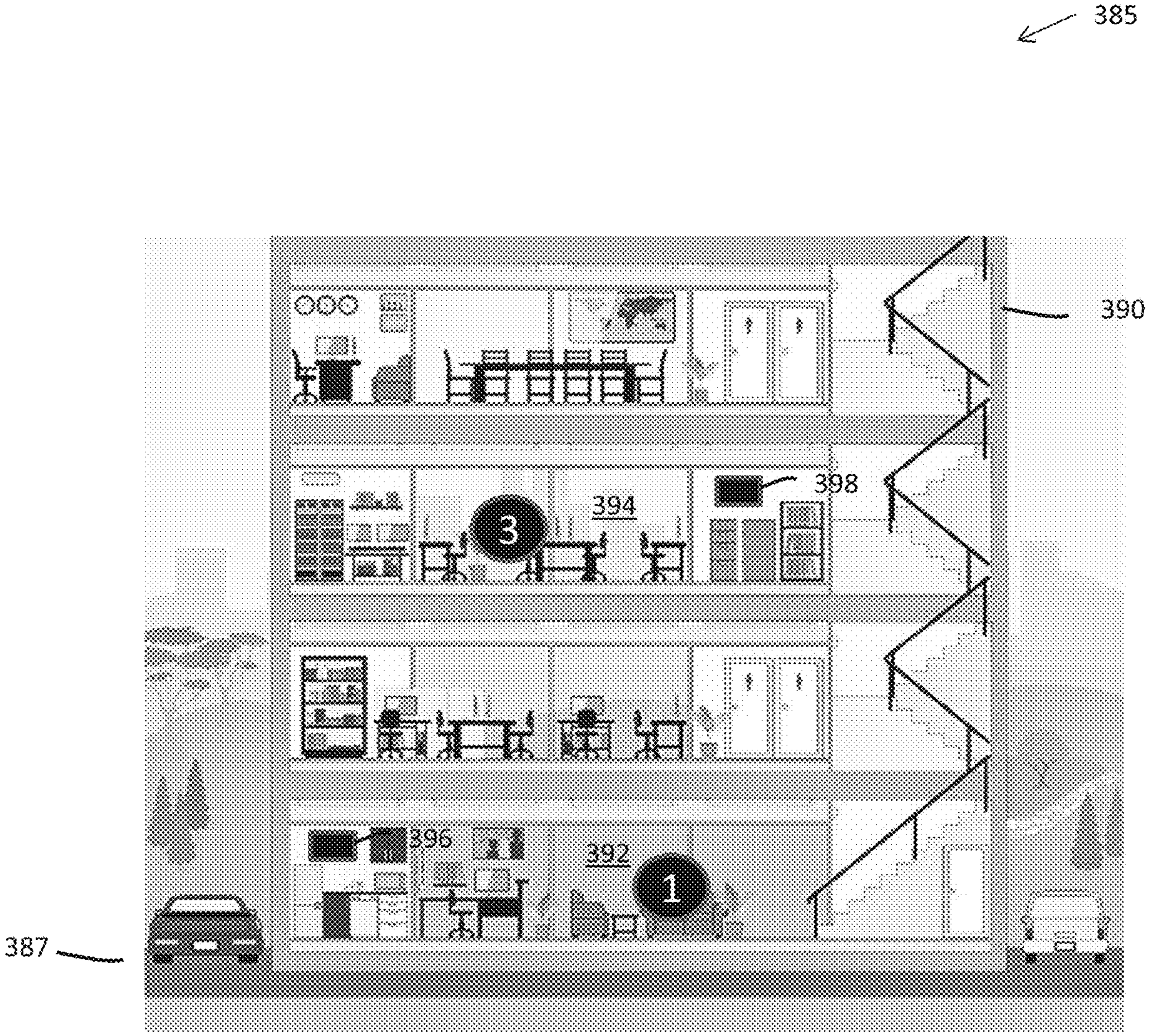
FIG. 3B is a diagram illustrating an example of uncalibrated altitude determination that may be used in crowd-sourcing of beacon altitudes.

For example, referring to FIG. 3B, in this case the reference point may be ground level 387.

Ground level or another known altitude may be assumed by examining a variety of indicia, where such indicia may vary based on the type of UE 110. For example, for UE 110 that is a mobile device (e.g., smartphone) or IoT device (e.g., sensor), indicia for ground level may be that the UE is in a moving automobile. The 3D positioning client 126 may monitor speed of the UE 110 (e.g., as determined by the native positioning engine 124) and if the speed is within a given range (e.g., between high and low thresholds) consistent with automobile travel conclude the UE is in a moving vehicle. Since automobiles typically travel at ground level, a reference pressure for AGL=0 may be established. Similarly, for UE 110 that is a mobile device (e.g., smartphone) or wearable (e.g., smartwatch), indicia for ground level may be that the UE is in an area known to have few (or no) buildings. Presence of buildings may be determined from map or clutter data. A lack of buildings near the UE may indicate that the UE is likely at ground level and a reference pressure for AGL=0 may be established. Further, for UE 110 that is a drone (e.g., UAV), indicia for ground level may be that the UE is powered on. The 3D positioning client 126 may monitor power status of the UE. Since drones typically are at ground level before they become airborne, a reference pressure for AGL=0 may be established. Still further, for UE 110 that is a wearable (e.g., smartwatch), indicia for ground level may be that a user of the UE is walking or running. The 3D positioning client 126 may monitor speed of the UE 110 (e.g., as determined by the native positioning engine 124) and if the speed is within a given range consistent with walking or running (e.g., between high and low thresholds) and a GNSS-based position fix is changing (indicating the user is likely not on a treadmill) conclude the user of the UE is in walking or running. Since users typically walk or run at ground level, a reference pressure for AGL=0 may be established. Still further, for any type of UE 110, indicia for a previously determined altitude of a beacon already in the beacon database 142) may be determining there is LOS to such beacon, using any of the techniques described herein. It should be understood that a wide variety of other indicia, or combinations of indicia, may alternatively be used.

At step 312, on each UE 110, the 3D positioning client 126 determines if weather conditions with have changed with respect to the reference point. In one embodiment, whether conditions may be assumed to be substantially constant over a period of time (e.g., 1 hour (hr)), and the determination implemented as a timer (e.g., a 1 hr timer). Alternatively, weather conditions may be determined based on weather data accessible from other data sources (e.g., a pressure and weather station network 160), based on information from sensors on the UE, etc.

If weather conditions have changed, execution may loop to step 310, where the positioning client 126 establishes a new reference point. If not, execution proceeds to step 314 where the 3D positioning client 126 tracks relative altitude changes with respect to the reference point. Tracking may include collecting UBP measurements, collecting indicia of user activity, an or other types of data. The UBP measurements may be obtained by an uncalibrated pressure sensor 132. The indicia of user activity may be indicia that indicates an altitude change of a known amount. For example, an indicia a user has changed level in a structure (e.g., moved up or down a flight of stairs) may equated to an altitude change of one story (approximately 3 meters (m)). The indicia of user activity may be based on velocity, acceleration, changes in position, and/or other types of data collected by components 132-138 of the UE 110, or derived from information collected by components 132-138 of the UE 110. The relative altitude changes (e.g., UBP, indicia of user activity, etc.) together with timestamps, may be stored in a local cache of the 3D positioning client 126.

For example, referring to FIG. 3B, the UE may initially be moved into the first floor 392 of a structure 390 (e.g., an office building) to position 1, still substantially at ground level. The 3D positioning client 126 may collect UBP for position 1 and store it together with a timestamp. The UE may then be moved into the third floor 394 of the structure 390 to position 3. The 3D positioning client 126 may collect UBP for position 3 and store it together with a timestamp.

Simultaneous to steps 310-314, at step 320, on each UE 110, the 3D positioning client 126 observes beacons within range of the UE, including at their identities, signal strength (e.g., RSSI), connection status (e.g., a "connected" flag"), timing measurement (e.g., TA, RTT, etc.), and/or other characteristics. The observations may be the result of scans performed using the native positioning engine 124 and the wireless network interface 134. The characteristics of observed beacons together with a timestamp may be stored in the local cache of the 3D positioning client 126.

For example, referring to FIG. 3B, when the UE 110 is at position 1, the 3D positioning client 126 may observe a beacon 396 on the first floor 392 and a beacon 398 on the third floor 394 of the structure 390, and store their characteristics together with a timestamp. Subsequently, when the UE 110 is at position 2, the positioning client 126 may again observe the beacon 396 on the first floor 392 and the beacon 398 on the third floor of the structure 390, but their characteristics may have changed. The positioning client 126 may store their new characteristics together with a timestamp.

Periodically, or in response to a dynamic trigger (e.g., receiving a user opt-in, detecting an emergency call, etc.), contents of the local cache of each UE are uploaded to the 3D positioning platform 140 in the cloud as a batch. For each UE 110 providing a batch, at step 330, the z-axis positioning server 146 of the cloud-based 3D positioning platform 140 calculates altitude of the UE based on a reference point and any tracked altitude changes. For example, z-axis positioning server 146 may use a barometric formula, such as:

$$h = \frac{\left(\left(\frac{P_0}{P}\right)^{\frac{1}{5.257}} - 1\right) \times (T + 273.15)}{0.0065}$$

where T is temperature in Celsius (measurable by the UE or set to a constant), $P_0$ is reference pressure and P is an average of UBP measurements over a time interval (e.g., 1 s). Likewise, the 3D positioning client 126 may determine altitude change based on the indicia of user activity. For example, if user activity indicated climbing a flight of stairs, a change equivalent to a story (e.g. 3 m) may be assumed. Initially, the z-axis positioning server 146 may simply add the change to the reference altitude. Thereafter, the z-axis positioning server 146 may add the change to a previously calculated altitude to produce an updated quantity. As part of step 330, one or more initiators of altitude quality may be determined for each altitude. In one implementation, an indicator may be VPE and altitudes having VPE above a given threshold may be ignored in further processing. In another implementation, an indicator may be speed of the UE. Altitudes having speed above a given threshold may be ignored in further processing. The result of this step may be a list of good quality uncalibrated pressure-based absolute altitudes and timestamps, which may be used in conjunction with the characteristics of observed beacons and timestamps provided as part of the batch.

For example, referring to FIG. 3B, in this case, the 3D positioning platform 140 may calculate that altitude of the UE at position 1 is still substantially at ground level based on UBP being relatively unchanged. The 3D positioning platform 140 may calculate that altitude of the UE at position 2 has increased by two stories based on relative changes in UBP. These altitudes, along with observed beacons 396, 398 and timestamps may be provided part of the batch. At step 340, the z-axis positioning server 146 of the 3D positioning platform 140 establishes time windows (e.g., a 5 second (s) time windows) and separately examines altitudes for the UE 110 and observed beacons which fall within each time window.

At step 350, the z-axis positioning server 146 determines whether there is LOS to each beacon observed in each time window. Similar to as in the above discussed embodiment, LOS may be determined based on signal strength (e.g., RSSI), connection status (e.g., a "connected" flag"), timing measurements (e.g., TA value, RTT etc.) and/or other characteristics.

For example, referring to FIG. 3B, the z-axis positioning server 146 may determine that while at position 1 the UE has LOS with beacon 396, but not beacon 398. The z-axis positioning server 146 may determine that after the UE has moved to position 2 it has LOS with beacon 398, but not beacon 396.

At step 360, the z-axis positioning server 146 binds an altitude of the UE 110 to each beacon having LOS in the respective time window. Where there is a single altitude within the time window, that altitude may be bound to each beacon. When there are multiple altitudes within the time window, an altitude may be selected therefrom. In one implementation, the altitude closest in time to the center of the time window may be selected and used. Alternatively, altitudes may be combined (e.g., averaged) and the result bound to each beacon.

For example, referring to FIG. 3B, the z-axis positioning server 146 may bind the ground level altitude to beacon 396 and the altitude two stories higher to beacon 398.

After steps 330-360 have been performed for a set of UE 110 (e.g., a large number of UE), for each beacon, at step 370, the z-axis positioning server 146 determines beacon altitude of the beacon, based on a set of bound altitudes. Altitude of the beacon may be determined as the combination (e.g., average) of the bound altitudes for that beacon. Uncalibrated pressure-based absolute altitudes individually may have large uncertainty. However, average error may be small over a sufficiently large set. Alternatively, altitude for the beacon may be based on previously determined altitudes of one or more beacons already in the beacon database 142 inferred to be at a same level (e.g., floor of a building) from the bound altitudes. For example, if the beacon and a beacon having a previously determined altitude are repeatedly bound to substantially the same altitude, the two beacons may be assumed to be on the same level, and the previously determined altitude may be assigned to the beacon as well. Such inference may allow higher accuracy altitudes to be propagated among beacons at the same level.

At step 380, the 3D z-axis positioning server 146 updates the beacon database 142 to assign the determined altitude to the beacon. Steps 370-380 may thereafter be repeated for additional beacons. Thereafter, updated portions of the beacon database 142 (e.g., tiles) may be downloaded to UE and used by the 3D positioning client 126 to determine 3D positions of the UE (e.g., by trilateration, multilateration or other positioning techniques).

Figure 4:
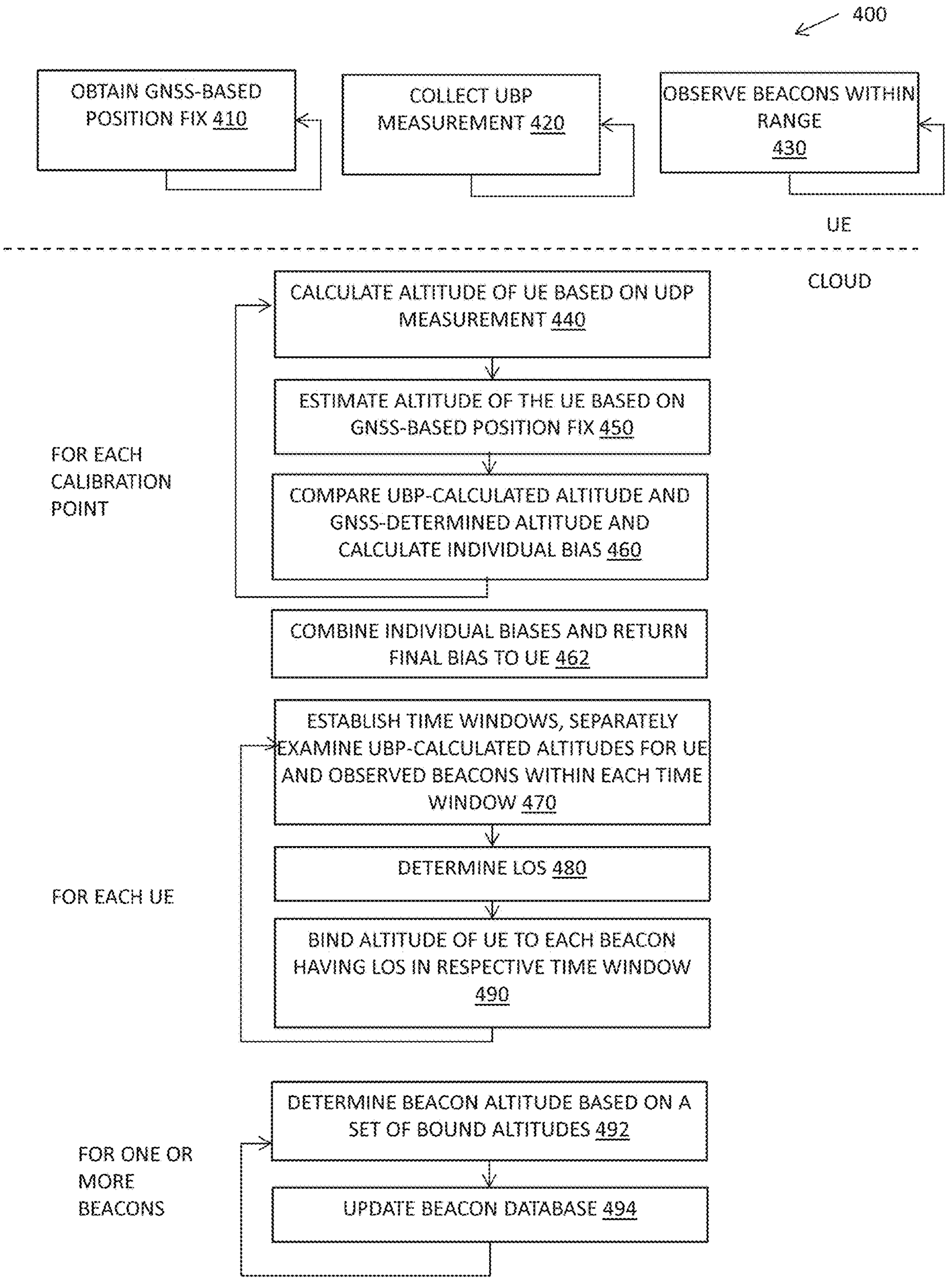
FIG. 4 is a flow diagram of an example sequence of steps for a combined beacon altitude crowd-sourcing technique and pressure sensor calibration technique.

In a third embodiment, the 3D positioning client 126 on UE 110 and the z-axis positioning server 146 of the 3D positioning platform 140 in the cloud implement a combined beacon altitude crowd-sourcing and pressure sensor calibration technique. Using such a technique beacon altitudes can be obtained to enable 3D positioning via (e.g., by trilateration, multilateration or other positioning techniques) while 3D positioning also be performed using calibrated pressure measurements. FIG. 4 is a flow diagram of an example sequence of steps 400 for a combined beacon altitude crowd-sourcing technique and pressure sensor calibration technique. Steps 410-420 may be performed in parallel on each of a large number of UE 110 to crowd source information. Steps 430-494 may be performed on the 3D positioning platform 140 in the cloud to aggregate the crowd-sourced information.

At step 410, on each UE 110, the 3D positioning client 126 obtains a GNSS-based position fix for the UE determined by the native positioning engine 124 working with the GNSS receiver 136. The GNSS-based position fix may be obtained periodically, in response to requests by the 3$^{rd}$ party applications 128, in response to requests by the 3D positioning client 126, and/or in response to other triggers. In one implementation, the GNSS-based position fix may be a fused position fix (e.g., an Android® fused location provider (FLP) fix) provided by the native positioning engine 124 that combines a GNSS position fix produced using the GNSS receiver 136 with a position estimate produced using wireless or cellular data. In another implementation, the GNSS-based position fix may be a solely GNSS position fix that is based on GNSS measurements and not combined with any other types of measurements. The GNSS-based position fix, together with timestamps, may be stored in a local cache of the 3D positioning client 126.

At step 420, on each UE 110, substantially simultaneous to obtaining a GNSS-based position fix, the 3D positioning client 126 collects a UBP measurement. UBP measurements may be obtained by an uncalibrated pressure sensor 132 (e.g., uncalibrated MEMS sensor). The GNSS-based position fix and UBP may be collectively referred to as a "calibration point". Steps 410-420 may be repeated to produce many calibration points, and each, together with a timestamp, stored in a local cache of the 3D positioning client 126.

In parallel to steps 410-420, one each UE, at step 430, the 3D positioning client 126 observes beacons within range of the UE 110 and their characteristics, including their identities signal strength (e.g., RSSI), connection status (e.g., a "connected" flag"), beacon timing (e.g., TA, RTT) and/or other characteristics. The observations may be the result of scans performed using the native positioning engine 124 and the wireless network interface 134. The characteristics of observed beacons together with a timestamp may be stored in a local cache of the 3D positioning client 126.

Periodically, or in response to a dynamic trigger, contents of the local cache of each UE may be uploaded to the 3D positioning platform 140 in the cloud as a batch. For each calibration point, at step 440, the z-axis positioning server 146 of the 3D positioning platform 140 calculates altitude of the UE 110 based on the UBP measurement, for example, using the above discussed barometric formula adjusted by the final bias (which is calculated below). In the first iteration, final bias may be set to zero. In some implementations, the calculation may also include weather data (e.g., barometric pressure corrections), for example, from the pressure and weather station network 160. Such weather data may be based on measurements collected contemporaneous to the UBP measurement, or based on historic measurements indicating trends or patterns.

At step 450, the z-axis positioning server 146 estimates altitude of the UE 110 based on the GNSS-based position fix, for example, by extracting the z-axis component from the GNSS-based position fix.

At step 460, the z-axis positioning server 146 compares the UBP-calculated altitude to GNSS-estimated altitude and calculates an individual bias (e.g., as the difference). The individual bias is combined (e.g., averaged) with preceding individual biases to produce a final bias. The individual bias may also be used as an indicator of quality of the related UBP-calculated altitude. If the UBP-calculated altitude has at least a predetermined quality (e.g., is related to an individual bias less than a threshold), the UBP-calculated altitude is retained for use in crowd-sourcing beacon altitudes. Otherwise it may be ignored in further processing.

After steps 450-460 have been repeated for each calibration point, at step 462, the final bias is returned to the UE 110 for use in calibrating the pressure sensor to enable calibrated pressure-based determination of UE attitude.

Further the retained high quality UBP-calculated altitudes and observed beacons are used in crowd sourcing beacon altitudes to update the beacon database 142. At step 470, the z-axis positioning server 146 of the cloud-based 3D positioning platform 140 establishes time windows (e.g., a 5 second (s) time windows) and examines UBP-calculated altitudes of the UE 110 from the above calibration operations and observed beacons that fall within the time window.

At step 480, the z-axis positioning server 146 determines whether there is LOS to each beacon observed in each time window. Similar to as in the above discussed embodiments, LOS may be determined based on signal strength (e.g., RSSI), connection status (e.g., a "connected" flag"), timing measurements (e.g., TA value RTT etc.) and/or other characteristics.

At step 490, the z-axis positioning server 146 binds an altitude of the UE 110 to each beacon having LOS. Where there is a single UBP-calculated altitude within the time window, that altitude may be bound to each beacon. When there are multiple UBP-calculated altitudes within the time window, an altitude may be selected therefrom. In one implementation, the UBP-calculated altitude closest in time to the center of the time window may be selected and used. Alternatively, UBP-calculated altitudes may be combined (e.g., averaged) and the result bound to each beacon. As mentioned above, the altitudes of the UE 110 may be corrected, for example, based on weather data from the pressure and weather station network 160. Additional corrections based on real time, or historic, data may also be applied at this stage, obtained from this or other sources.

After 470-490 have been performed for a set of UE 110 (e.g., a large number of UE), for each beacon, at step 492, the z-axis positioning server 146 determines beacon altitude of the beacon, based on a set of bound altitudes. Alternatively, altitude for the beacon may be based on previously determined altitudes of one or more beacons already in the beacon database 142 inferred to be at a same level (e.g., floor of a building) from the bound altitudes.

At step 494, the 3D z-axis positioning server 146 updates the beacon database 142 to assign the determined altitude to the beacon. Steps 492-494 may thereafter be repeated for additional beacons. Thereafter, updated portions of the beacon database 142 (e.g., tiles) may be downloaded to UE 110 and used by the 3D positioning client 126 to determine 3D positions of the UE (e.g., by trilateration, multilateration or other positioning techniques).

The above description details various crowd sourcing techniques to determine beacon altitudes that may then be used in 3D positioning of UE. It should be understood that the techniques and portions thereof may be utilized together, individually, or in combination with other techniques, depending on the implementation. Further, it should be understood that aspects of the techniques may be modified, added to, removed, or otherwise changed depending on the implementation. For example, while some of the description above may imply that determining LOS is a binary decision, it should be understood that LOS need not be binary and may instead be determined with a probability. Multiple beacons at different altitudes may have respectively probabilities of having LOS with UE 110 at a given time, and their altitudes weighted or otherwise combined to derive the altitude of the UE.

Likewise, while some of the description above may suggest that certain operations may be performed by the 3D positioning client 126 of the UE 110 or the 3D positioning platform in the cloud, it should be understood that operations may be performed in various locations, split between the UE 110, the cloud, or elsewhere, in a variety of different manners.

Additionally, while some of the description above may suggest that operations can occur in real-time, periodically or in response to dynamic triggers, it should be understood that operations may occur at any of a wide variety of different times in response to any of a wide variety of different criteria. For example, GNSS-based position fixes, UBP measurements, observed beacon characteristics, etc. may be stored together with timestamps (e.g., either cached on the UE 110 or maintained in the cloud) for later processing. When processed, the stored information may be combined with weather data (e.g., from the pressure and weather station network 160) having similar timestamps to calibrate data for UE attitude determination and/or increase accuracy of beacon altitude determinations.

In general, while specific example hardware and software is discussed above, it should be understood that the techniques may be implemented using a variety of different types of hardware, software, and combination thereof. Such hardware may include a variety of types of processors, memory chips, programmable logic circuits, application specific integrated circuits, and/or other types of hardware components that support execution of software. Such software may include executable instructions stored in a non-transitory electronic device-readable medium, such as a volatile or persistent memory device, a hard-disk, or other data store. Combinations of software and hardware may be adapted to suit different environments and applications. Above all, it should be understood that the above descriptions are meant to be taken only by way of example.

What is claimed is:

1. A method for crowd sourcing beacon altitudes for use in three dimensional (3D) positioning of user equipment (UE), comprising:
- for each of a plurality of UE:
  - estimating, by software executing on one or more electronic devices, altitude of the UE at a time based on a reference point measured by the UE and a tracked altitude change measured by the UE;
  - determining, by the software, that one or more beacons have line-of-sight (LOS) with the UE at the time based on observations of beacons by the UE; and
  - binding the altitude of the UE to each beacon of the one or more beacons having LOS at the time, wherein the time is a time window and the binding binds an altitude of the UE closest in time to a center of the time window to each beacon of the one or more beacons;
- for one or more beacons:
  - determining a beacon altitude based on a set of bound altitudes for the respective beacon; and
  - updating a beacon database with the determined beacon altitude, the beacon database usable to calculate 3D position of UE; and
- transmitting at least a portion of the beacon database to a device to enable the device to determine a 3D position of at least one UE based at least in part on beacon altitudes stored in the portion of the beacon database.

2. The method of claim 1, further comprising:
- providing, by the software, at least a portion of the beacon database to UE to enable the UE to calculate their 3D position.

3. The method of claim 1, wherein the reference point includes a reference pressure and a reference altitude, the tracked altitude change includes an uncompensated barometric pressure (UBP) measured by the UE, and the estimating the altitude of the UE at the time further comprises:
- applying a barometric formula to the reference pressure and the UBP to calculate change in altitude from the reference altitude.

4. The method of claim 1, wherein the reference point includes a reference altitude, the tracked altitude change includes an indicia of user activity involving a level change, and the estimating the altitude of the UE at the time further comprises:
- adjusting the reference altitude by the level change indicated by the user activity.

5. The method of claim 1, wherein the reference point includes a reference altitude, and the method further comprises:
- establishing the reference point for the UE based on uncompensated barometric pressure (UBP) measured by a pressure sensor of the UE; and
- observing one or more beacons within range of the UE based on signals received by a wireless network interface of the UE.

6. The method of claim 5, wherein the reference point further includes a reference altitude of ground level, and the establishing the reference point further comprises:
- assuming the UE is at ground level based on an indicia associated with a type of the UE, wherein two or more different types of UE have different indicia they are at ground level.

7. The method of claim 1, wherein the determining the one or more beacons have LOS further comprises:
- comparing a signal strength indicator for each of the one or more beacons to a threshold; and
- determining the signal strength indicator exceeds the threshold.

8. The method of claim 7, wherein at least one of the signal strength indicator or the threshold is based on a radio frequency (RF) band/channel, type of beacon, model of beacon of the type, or manufacturer of beacon of the type.

9. The method of claim 1, wherein the determining the one or more beacons have LOS further comprises:
- checking a connection status of the UE to each of the one or more beacons; and
- determining the connection status indicates the UE is connected.

10. The method of claim 1, wherein the determining the one or more beacons have LOS further comprises:

comparing timing measurements and signal strength of a plurality of signal measurements for the beacon; and determining a signal measurement that has a timing measurement less than a threshold has a greater signal strength than others of the plurality of signal measurements.

11. The method of claim 1, wherein the determining the beacon altitude based on the set of bound altitudes further comprises:

averaging the altitudes of the set of bound altitudes.

12. The method of claim 1, wherein the determining the beacon altitude based on the set of bound altitudes further comprises:

determining a beacon and another beacon having a previously determined altitude are bound to the same altitude; and assigning the previously determined altitude of the another beacon to the beacon.

13. An apparatus, comprising:

a memory; and one or more processors communicatively coupled to the memory, the one or more processors, either alone or in combination, configured to:

for each of a plurality of user equipment (UE):

estimate altitude of the UE at a time based on a reference point measured by the UE and a tracked altitude change measured by the UE;

determine that one or more beacons have line-of-sight (LOS) with the UE at the time based on observations of beacons by the UE; and bind the altitude of the UE to each beacon of the one or more beacons having LOS at the time, wherein the time is a time window and the binding binds an altitude of the UE closest in time to a center of the time window to each beacon of the one or more beacons;

for one or more beacons:

determine a beacon altitude based on a set of bound altitudes for the respective beacon; and update a beacon database with the determined beacon altitude, the beacon database usable to calculate three dimensional (3D) position of UE; and transmit at least a portion of the beacon database to a device to enable the device to determine a 3D position of at least one UE based at least in part on beacon altitudes stored in the portion of the beacon database.

14. The apparatus of claim 13, wherein the one or more processors, either alone or in combination, are further configured to:

provide at least a portion of the beacon database to UE to enable the UE to calculate their 3D position.

15. The apparatus of claim 13, wherein the reference point includes a reference pressure and a reference altitude, the tracked altitude change includes an uncompensated barometric pressure (UBP) measured by the UE, and the one or more processors configured to estimate the altitude of the UE at the time comprises the one or more processors, either alone or in combination, configured to:

apply a barometric formula to the reference pressure and the UBP to calculate change in altitude from the reference altitude.

16. The apparatus of claim 13, wherein the reference point includes a reference altitude, the tracked altitude change includes an indicia of user activity involving a level change, and the one or more processors configured to estimate the altitude of the UE at the time comprises the one or more processors, either alone or in combination, configured to:

adjust the reference altitude by the level change indicated by the user activity.

17. The apparatus of claim 13, wherein the reference point includes a reference altitude, and the one or more processors, either alone or in combination, are further configured to:

establish the reference point for the UE based on uncompensated barometric pressure (UBP) measured by a pressure sensor of the UE; and observe one or more beacons within range of the UE based on signals received by a wireless network interface of the UE.

18. The apparatus of claim 13, wherein the one or more processors configured to determine the one or more beacons have LOS comprises the one or more processors, either alone or in combination, configured to:

compare a signal strength indicator for each of the one or more beacons to a threshold; and determine the signal strength indicator exceeds the threshold.

19. An apparatus, comprising:

for each of a plurality of user equipment (UE):

means for estimating altitude of the UE at a time based on a reference point measured by the UE and a tracked altitude change measured by the UE;

means for determining that one or more beacons have line-of-sight (LOS) with the UE at the time based on observations of beacons by the UE; and means for binding the altitude of the UE to each beacon of the one or more beacons having LOS at the time, wherein the time is a time window and the binding binds an altitude of the UE closest in time to a center of the time window to each beacon of the one or more beacons;

for one or more beacons:

means for determining a beacon altitude based on a set of bound altitudes for the respective beacon; and means for updating a beacon database with the determined beacon altitude, the beacon database usable to calculate three dimensional (3D) position of UE; and means for transmitting at least a portion of the beacon database to a device to enable the device to determine a 3D position of at least one UE based at least in part on beacon altitudes stored in the portion of the beacon database.

* * * * *